(12) United States Patent
Mainini

(10) Patent No.: US 8,596,220 B2
(45) Date of Patent: Dec. 3, 2013

(54) LIQUID TREAT DISPENSING SYSTEM AND METHOD OF USING THE SAME

(75) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 180 days.

(21) Appl. No.: 12/886,811

(22) Filed: Sep. 21, 2010

(65) Prior Publication Data

US 2012/0067290 A1    Mar. 22, 2012

(51) Int. Cl.
*A01K 7/00* (2006.01)

(52) U.S. Cl.
USPC .......................................... 119/72; 119/51.03

(58) Field of Classification Search
USPC ......... 119/72, 51.03, 663; 132/317, 318, 320; 426/1–2, 115, 134; 401/209, 213, 216; 222/414, 631
See application file for complete search history.

(56) References Cited

U.S. PATENT DOCUMENTS

| | | | |
|---|---|---|---|
| 3,111,703 A * | 11/1963 | Kaufman | 401/214 |
| 3,355,241 A * | 11/1967 | Rowe | 401/213 |
| 3,376,551 A * | 4/1968 | Armbruster | 382/188 |
| 3,589,338 A | 6/1971 | Lovitz | |
| 3,771,496 A | 11/1973 | Atchley | |
| 3,946,703 A | 3/1976 | Wheat | |
| 4,164,377 A * | 8/1979 | Lohrman et al. | 401/213 |
| 4,368,184 A * | 1/1983 | Drucker et al. | 424/66 |
| 4,475,837 A * | 10/1984 | Dornbusch et al. | 401/213 |
| 4,605,554 A | 8/1986 | Prussin et al. | |
| 4,940,350 A * | 7/1990 | Kim | 401/209 |
| 5,051,017 A * | 9/1991 | Yorks | 401/209 |
| 5,109,798 A | 5/1992 | Impastato et al. | |
| 5,143,022 A * | 9/1992 | Fore | 119/51.03 |
| 5,201,279 A * | 4/1993 | Impastato et al. | 119/51.03 |
| 5,553,957 A * | 9/1996 | Dornbusch et al. | 401/209 |
| 5,706,761 A | 1/1998 | Mayer | |
| 6,293,226 B1 | 9/2001 | Hwang | |
| 6,588,368 B1 * | 7/2003 | Cheng | 119/51.03 |
| 6,718,912 B2 | 4/2004 | Pappas | |
| 6,758,165 B2 | 7/2004 | Pappas et al. | |
| 7,117,818 B2 | 10/2006 | Pappas et al. | |
| 7,618,208 B2 * | 11/2009 | Baines et al. | 401/213 |
| 7,651,292 B2 * | 1/2010 | Tavares da Silva | 401/214 |

* cited by examiner

*Primary Examiner* — Rob Swiatek
*Assistant Examiner* — Kathleen Alker
(74) *Attorney, Agent, or Firm* — Pitts & Lake, P.C.

(57) ABSTRACT

An apparatus and method of supplying liquid consumable substances to animals using a dispenser device, including storing a volume of viscous fluid in a storage chamber of the dispensing device, capturing a roller ball in a flanged opening at an open end of the dispensing device such that a first surface of the roller ball communicates with the storage chamber, communicating at least a portion of the stored volume to the first surface such that a quantity of the stored volume adheres to the first surface, and exposing a second surface of the roller ball to an animal's tongue such that when the animal licks the second surface, the roller ball rotates with respect to the flanged opening to deliver at least a portion of the adhered quantity to the animal as a reward for a desired exhibited behavior of the animal.

18 Claims, 4 Drawing Sheets

LIQUID TREAT DISPENSING SYSTEM AND METHOD OF USING THE SAME

BACKGROUND OF THE INVENTION

1. Field of Invention

The present general inventive concept relates generally to an apparatus and method of dispensing consumable food supplements to animals, and more particularly, to a portable handheld apparatus to evenly and cleanly dispense liquid treats to animals to reward and/or refresh the animal.

2. Description of the Related Art

Pet owners routinely encounter a variety of issues when engaging their pets in activities away from the home. For example, dog owners encounter issues associated with satisfying a dog's thirst and/or providing a treat to the dog as a reward for a desired exhibited behavior when the dog and owner are engaged on a walk or in other athletic or recreational activity. Efforts have been made to develop dispensing devices and/or systems to provide fluid refreshment to pets while the pet is in a cage or away from naturally occurring sources of fluid refreshment, but such known devices are typically inconvenient, messy, unhealthy, and/or impractical to be portably carried by the pet owner to train or refresh the pet during activities away from the home, and are less than satisfactory in portably and repetitively dispensing relatively small portions of a consumable substance for training purposes without satiating the animal. Moreover, current treats and dispensers are typically messy (oily or crumbly), smelly, high in calories, expensive, are not easily accessible or portable. Current treats can also lack uniform size and can be filling to the animal when repetitively offered to the animal, causing lethargy and lack of interest in the animal, thus limiting the number of training/reward opportunities available during a particular activity. Such high calorie and filling treats are typically kept in the home, and are cumbersome to transport away from the home, reducing the number of training opportunities available when the pet and owner are away from the home.

BRIEF SUMMARY OF THE INVENTION

The present general inventive concept provides an apparatus and method of dispensing liquid treats to animals using a handheld dispenser including a roller ball that can pick up a predetermined amount of a liquid treat to supply the treat to the animal when the animal licks an exposed surface of the ball.

Additional features and embodiments of the present general inventive concept will be set forth in part in the description which follows and, in part, will be obvious from the description, or may be learned by practice of the general inventive concept.

Example embodiments of the present general inventive concept can be achieved by providing a method of supplying liquid treats to animals using a dispensing device, including providing a storage chamber in the dispensing device to store a volume of liquid treat therein, rotatably capturing a roller ball in a flanged opening at an open end of the dispensing device, and providing a passageway between the roller ball and the storage chamber to communicate at least a portion of the stored volume to a first surface of the roller ball such that as the roller ball rotates with respect to the flanged opening, a predetermined amount of the communicated portion adheres to the first surface and becomes exposed to an outside of the dispensing device.

The method can include forming a gap between an inner surface of the flanged opening and the roller ball to enable the roller ball to rotatably float within the flanged opening such that a width of the gap determines the amount of the adhered portion exposed to the outside of the device.

The method can also include installing a cap over the roller ball to drive the roller ball toward the storage chamber to create a seal between the roller ball and the passageway to prevent rotation of the roller ball.

The amount of liquid treat exposed to the outside of the device can be determined based on at least one of a texture of the first surface, a diameter of the ball, and a viscosity of the liquid treat.

When the open end of the hand-held dispenser is oriented substantially downward, it is possible that at least a portion of the stored volume can continuously communicate with a surface of the roller ball to repetitively adhere a predetermined quantity of liquid treat to the roller ball and can expose the predetermined quantity to the outside of the dispensing device as the roller ball rotates with respect to the flanged opening.

Example embodiments of the present general inventive concept can also be achieved by providing a method of training an animal using a dispensing device, including storing a volume of viscous fluid in a storage chamber of the dispensing device, capturing a roller ball in a flanged opening at an open end of the dispensing device such that a first surface of the roller ball communicates with the storage chamber, communicating at least a portion of the stored volume to the first surface such that a quantity of the stored volume adheres to the first surface, and exposing a second surface of the roller ball to an animal's tongue such that when the animal licks the second surface, the roller ball rotates with respect to the flanged opening to rotatably expose the first surface to the animal's tongue to deliver at least a portion of the adhered quantity to the animal as a reward for a desired exhibited behavior of the animal.

The method can include communicating another portion of the stored volume to the second surface such that another quantity of the stored volume adheres to the second surface, wherein when the animal licks the first surface, the roller ball rotates with respect to the flanged opening to rotatably expose the second surface to the animal's tongue to deliver another portion of the another adhered quantity to the animal as a reward for the desired exhibited behavior of the animal.

The method can further include repeating the communicating and exposing operations to train the animal to perform the exhibited behavior without satiating the animal.

When the animal repetitively licks an exposed surface of the roller ball, it is possible that a predetermined amount of liquid treat can be delivered to the animal's tongue with each lick.

Example embodiments of the present general inventive concept can also be achieved by providing a portable device to supply a liquid consumable substance to an animal, including a storage chamber to store a volume of liquid consumable substance therein, a flanged opening disposed at an open end of the portable device, a roller ball rotatably captured in the flanged opening, and a passageway disposed between a first surface of the roller ball and the storage chamber to communicate at least a portion of the stored volume to the first surface such that as the roller ball rotates with respect to the flanged opening, a predetermined amount of the communicated portion adheres to the first surface and becomes exposed to an outside of the portable device.

The device can include a gap between an inner surface of the flanged opening and the roller ball to enable the roller ball to rotatably float within the flanged opening such that a width of the gap determines the amount of the adhered portion exposed to the outside of the portable device.

The device can also include a detachable cap installed over the roller ball to drive the roller ball toward the storage chamber to create a seal between the roller ball and the passageway to prevent rotation of the roller ball when the cap is installed over the roller ball.

BRIEF DESCRIPTION OF THE SEVERAL VIEWS OF THE DRAWINGS

The above-mentioned features of the present general inventive concept will become more clearly understood from the following detailed description in conjunction with the drawings, in which.

DETAILED DESCRIPTION OF THE INVENTION

Figure 1:
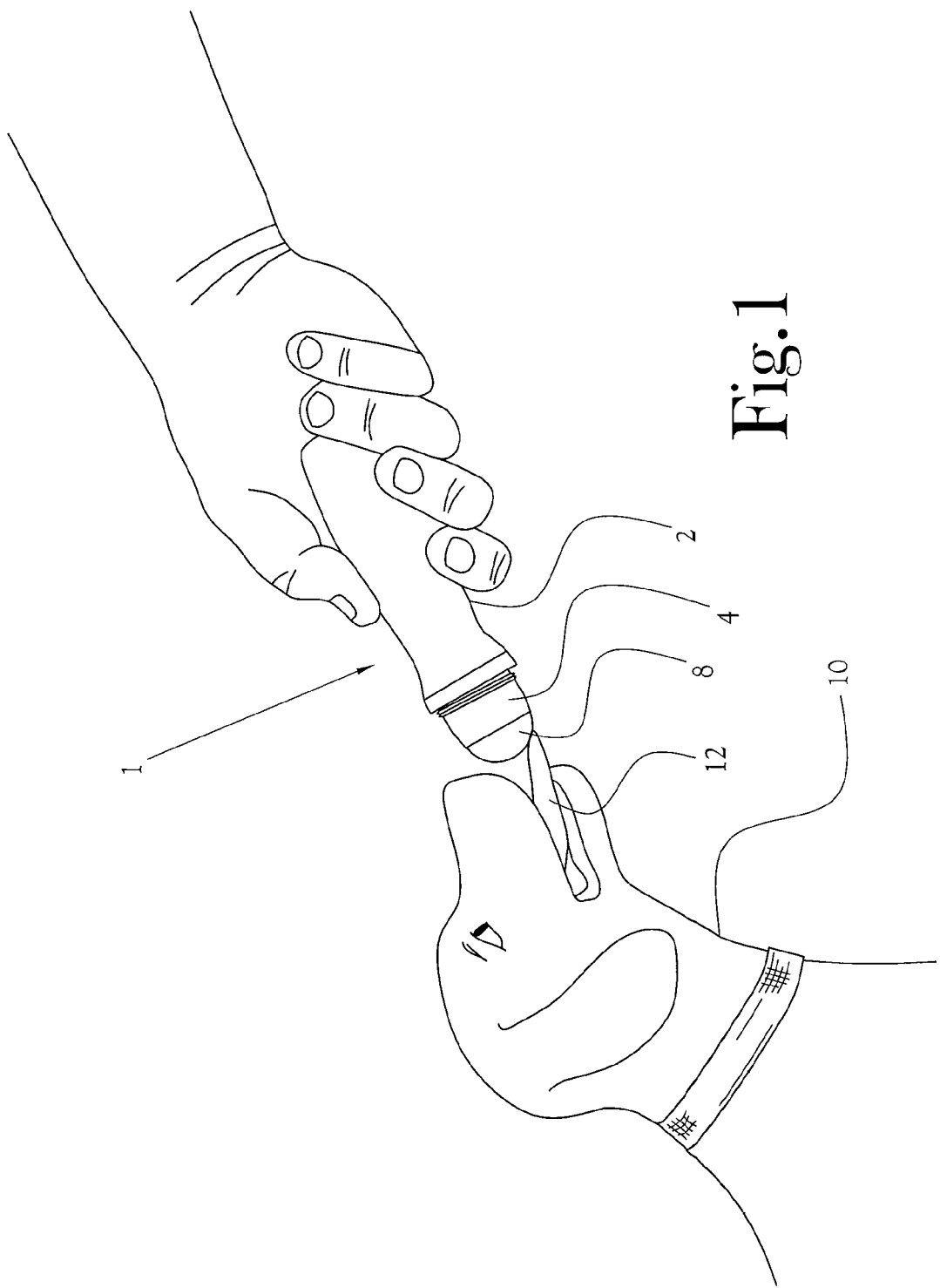
FIG. 1 illustrates an application of a liquid treat dispenser according to an example embodiment of the present general inventive concept.

Reference will now be made to various embodiments of the present general inventive concept, examples of which are illustrated in the accompanying drawings, wherein like reference numerals refer to like elements throughout. The following description of the various example embodiments is merely exemplary in nature and is in no way intended to limit the present general inventive concept, its application, or uses. The example embodiments are merely described below in order to explain the general inventive concept by referring to the figures.

The following detailed description and claims may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept. The present general inventive concept provides an apparatus and method of dispensing liquid treats to animals using a handheld dispenser including a roller ball that can pick up a predetermined amount of a liquid treat to supply the treat to the animal when the animal licks an exposed surface of the ball.

FIG. 1 illustrates an application of a liquid treat dispenser 1 according to an example embodiment of the present general inventive concept. The exemplary liquid treat dispenser 1 is configured in a relatively small, handheld size to be handled by a person's hand, and can be easily carried by the pet owner, for example in a pocket or purse, when not in use, giving the pet owner ready access to the treat. The convenient structure of the liquid treat dispenser 1 will enable the owner to quickly and easily provide many more treat instances to the animal throughout the time the pet and owner are together, improving consistency and training of the animal. The exemplary liquid treat dispenser of the present general inventive concept can be fabricated from conventional materials of construction, such as plastic(s), rubber(s), synthetic(s), and the like, but the present general inventive concept is not limited to any particular material(s) of construction.

As illustrated in FIG. 1, the liquid treat dispenser 1 includes a handle portion 2, an annular flanged opening 4, and a roller ball 8. The annular flanged opening 4 is disposed at one end of the handle portion 2 to receive the roller ball 8 therein, and includes an inwardly curved surface configured in shape and size to rotatably capture, circumferentially, the roller ball 8 within the opening 4. The roller ball 8 and flanged opening 4 are dimensioned such that the roller ball 8 can freely rotate within the flanged opening 4, while remaining captured within the opening 4 to minimize axial movement of the roller ball 8. Accordingly, based on the manner in which the roller ball 8 is captured within the flanged opening 4, the roller ball 8 is capable of rotatable movement with respect to the flanged opening 4, and limited axial movement relative to the handle portion 2. The outside surface of the handle portion 2 can be contoured for gripping by the hand of the pet owner.

Figure 2:
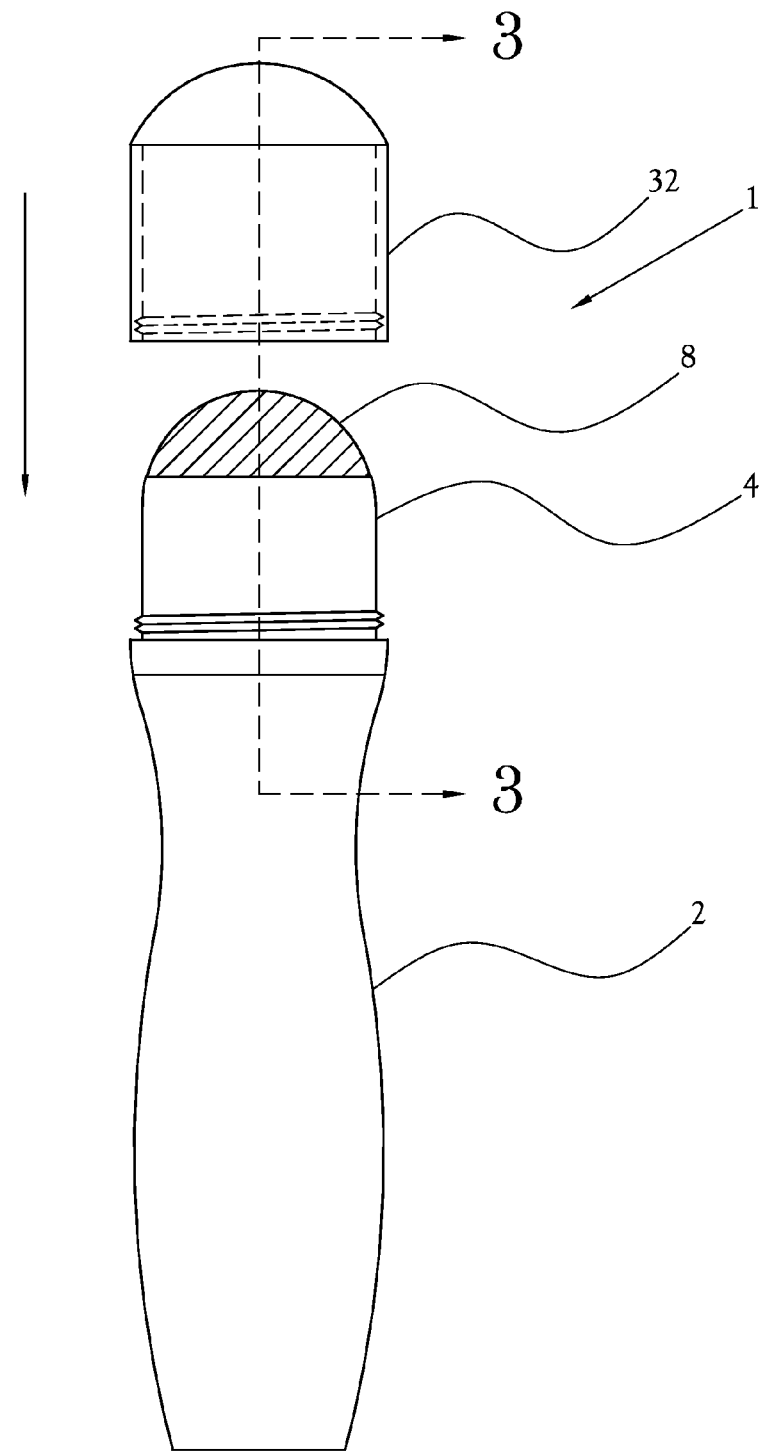
FIG. 2 is a perspective view of an exemplary liquid treat dispenser according to an example embodiment of the present general inventive concept.

FIG. 2 illustrates an example configuration of a roller ball 8 rotatably installed in the flanged opening 4 of the handle portion 2. Referring to FIG. 2, an exposed surface (i.e., upper surface in FIG. 2) of the roller ball 8 is configured to protrude beyond the end of the flanged opening 4, i.e., beyond the centerline C of the roller ball 8 to facilitate capture of the roller ball 8 in the flanged opening 4. For example, it is possible to capture the roller ball 8 in the flanged opening 4 by dimensioning the flanged opening to include an inwardly curved end extending slightly beyond the centerline C of the roller ball 8 such that the roller ball 8 is rotatably captured within the flanged opening 4. The dispenser 1 can include a detachable cap 32 to cover the top end of the dispenser 1.

Figure 3:
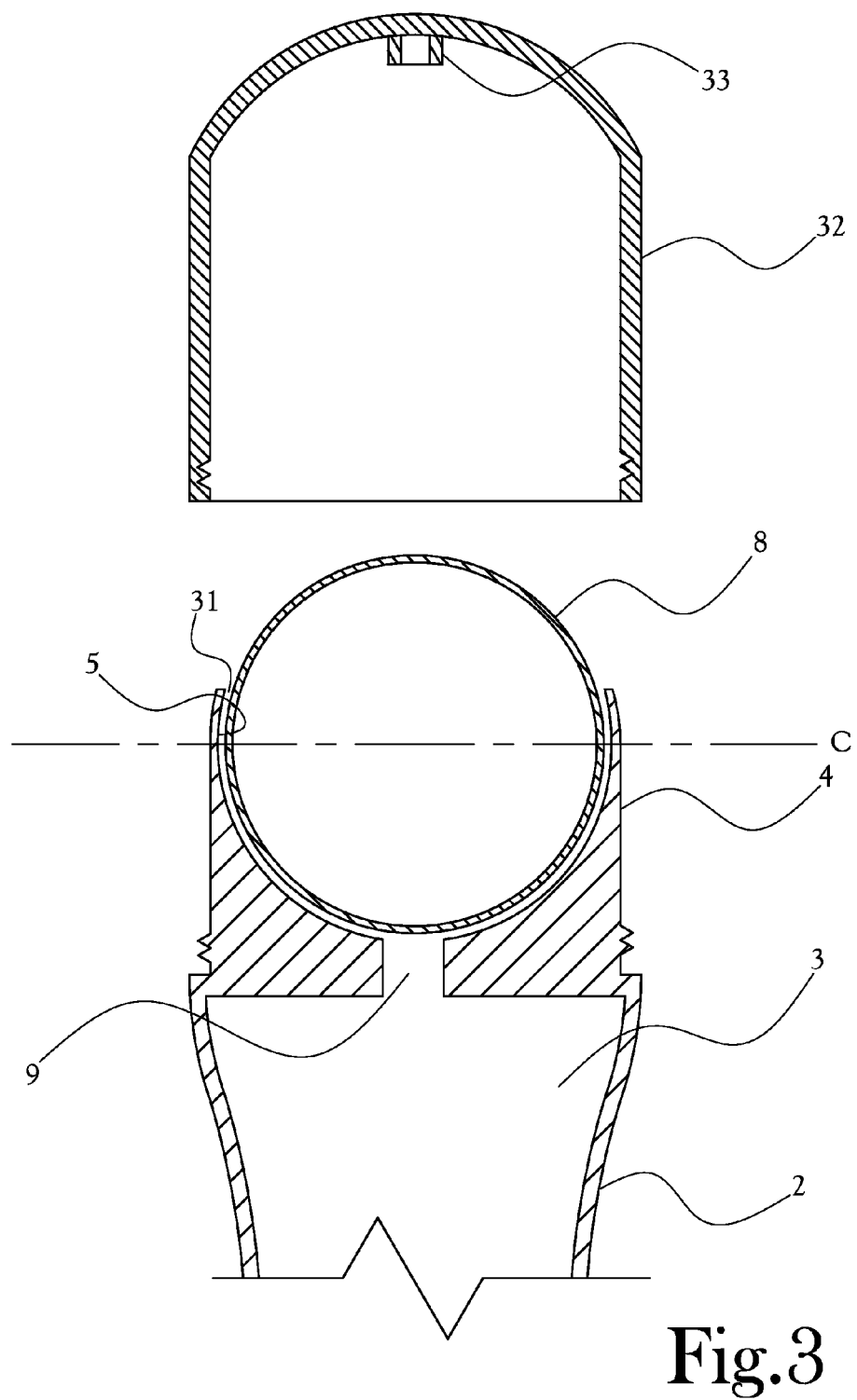
FIG. 3 is a detail view of the exemplary liquid treat dispenser according to an example embodiment of the present general inventive concept.
Figure 4:
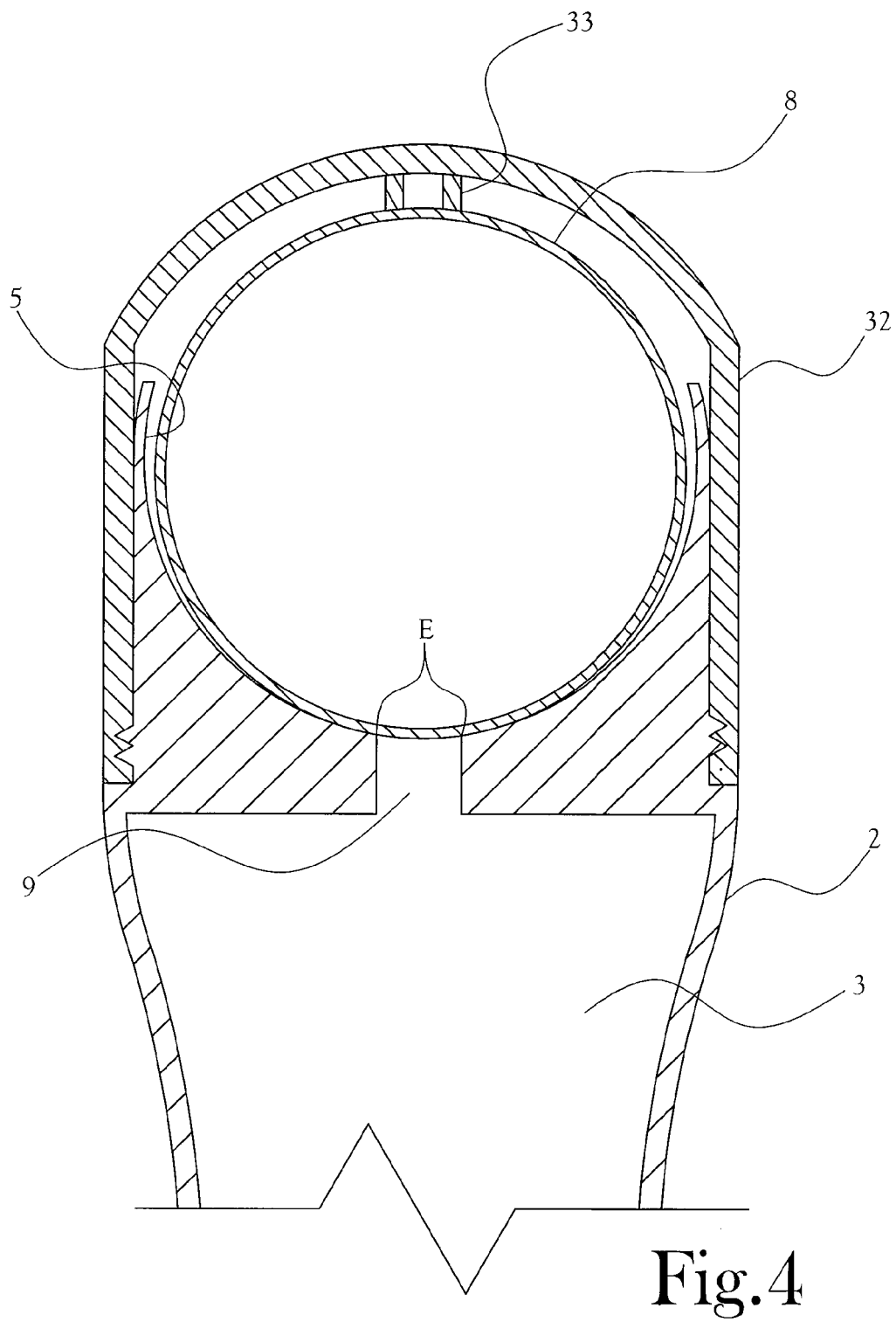
FIG. 4 is a detail view of the exemplary liquid treat dispenser with the cap installed according to an example embodiment of the present general inventive concept.

Referring to FIGS. 3 and 4, the liquid treat dispenser 1 can include a threaded cylindrical cap 32 to be detachably secured to the outside neck portion of the liquid treat dispenser 1 by threading the cap 32 onto the mating threads of the neck portion, as illustrated in FIG. 3. An example operation of the threaded cap 32 will be described in more detail below in connection with FIG. 4.

FIG. 3 is a detail view of the exemplary liquid treat dispenser according to an example embodiment of the present general inventive concept. As illustrated in FIG. 3, a relatively narrow gap 31 can be provided between an inside surface 5 of the flanged opening 4 and the outside diameter of the roller ball 8, with results being that the roller ball 8 is permitted to float slightly within the flanged opening 4 when the underside of the roller ball 8 is communicating with the liquid treat substance (not illustrated) stored inside the storage chamber 3, as exemplified by the substantially continuous gap 31 disposed around the underside of the roller ball 8.

Referring to FIG. 3, the handle portion 2 includes a hollow storage chamber 3 to store a quantity of liquid treat substance therein. The liquid treat substance can have a predetermined viscocity and/or can be a water-based substance having a flavor or scent that is appealing to the animal. For example, it is possible that the liquid substance could be water, grease, fats, or any other type of processed or naturally occurring fluid or gel to be consumed by the animal, and may include functional additives such as vitamins, herbs, electrolytes, and the like, to aid in the overall health of the pet, and may include multiple flavor offerings. However, the present general inventive concept is not limited to any particular type of fluid or liquid substance.

As illustrated in FIG. 3, an internal passageway 9 can be provided between the storage chamber and the flanged opening 4 to permit the flow of liquid treat from the storage chamber 3 to the underside of the roller ball 8. The storage chamber 3 stores a volume the liquid treat substance, from which a predetermined amount can be delivered to the animal via the roller ball 8. The diameter of the roller ball 8 and the size and shape of the flanged opening 4 can be configured to permit the roller ball 8 to rotate freely within the flanged opening 4. In this configuration, the flow of liquid substance through the passageway 9 enables the roller ball 8 to pick-up a quantity of the liquid treat as the pet is licking the ball 8 to facilitate a smooth and even dispensing of the liquid to the animal with each lick.

As illustrated in FIG. 3, passageway 9 can facilitate fluidic communication between the storage chamber 3 and the underside of the roller ball 8 when the handle portion 2 is inverted due to gravitational forces, and the roller ball 8 can buoyantly float within the gap 31 as the liquid treat substance is communicating with the underside of the roller ball 8. For example, when the liquid treat dispenser 1 is shaken or when the open end of the handle portion 2 is pointing in a downward direction (i.e. toward the ground), it is possible for the liquid treat substance stored in the storage chamber to flow through the passageway 9 such that the liquid treat can contact at least a portion of an underside of the roller ball 8 causing a gap 31 to form between the outer surface of the roller ball 8 and the inner surface of the opening 4. Due to the physical and/or chemical characteristics of the liquid substance and roller ball 8, such as viscosity, texture, and the like, a portion of the liquid treat can be coated or adhered to the underside of the roller ball 8 as the liquid treat contacts the underside of the roller ball 8. The roller ball 2 may include a textured surface configured to facilitate adherence of the liquid treat substance to the surface of the roller ball 8 when the liquid substance contacts the roller ball 8. In other example embodiments, it is possible that the handle portion 2 could be designed as a squeeze bottle, enabling a user to squeeze the handle portion 2 to create an internal pressure within the storage chamber 3 to force the liquid treat against the roller ball 8 to facilitate delivery of the liquid treat to the animal as the animal licks and rotates the roller ball 8.

When the roller ball 8 of the liquid treat dispenser 1 is presented to the animal 10 as illustrated in FIG. 1, the open end of the hand held dispenser and the exposed surface of the ball 8 are oriented substantially downward such that the animal can lick the exposed surface of the roller ball 8 with its tongue 12. When the animal licks the exposed surface of the roller ball 8, the animal's licking action can cause the roller ball 8 to rotate within the flanged opening 4, with results being that a portion of the liquid substance can be delivered from the underside of the roller ball 8 through the gap 31 to the tongue of the animal, allowing the animal to consume the liquid treat, as illustrated in FIG. 3. The size of the gap 31 can be dimensioned to permit a predetermined thickness of the adhered liquid treat to pass therethrough, facilitating smooth and even delivery of a predetermined quantify of liquid treat to the animal.

Referring to FIG. 3, the gap 31 between the circumferential surface 5 and the roller ball 8 can facilitate a smooth and even dispensing of the liquid when the roller ball 8 is licked by the pet. That is, the gap 31 can be dimensioned to enable passage of only a predetermined thickness of the liquid substance adhered to the ball, to control the amount of liquid being delivered to the animal with each lick. Moreover, when the pet's licking action ceases, the gap 31 between the circumferential surface 5 and the roller ball 8 can be small enough to prevent undesired passage of viscous liquid when the roller ball 8 is not being rotated, thus minimizing undesired liquid dispersal through the roller ball 8, even when the liquid treat dispenser 1 remains in an inverted orientation, as illustrated in FIG. 1.

FIG. 4 is a detail view of the exemplary liquid treat dispenser with the cap 32 installed to cover the exposed surface of the roller ball 8 to prevent undesired liquid dispersal when the liquid treat dispenser 1 is not in use according to an example embodiment of the present general inventive concept.

Referring to FIGS. 3 and 4, the liquid treat dispenser 1 can include a threaded cylindrical cap 32 to be detachably secured to the outside neck portion of the liquid treat dispenser 1 by threading the cap 32 onto mating threads of the neck portion. As illustrated in FIG. 3, a protrusion 33 can be provided under the top surface of the cap 32 to contact the exposed surface of the roller ball 8 when the cap 32 is installed on the dispenser 1.

For example, as illustrated in FIG. 4, the protrusion 33 can be dimensioned to press the roller ball 8 against a bottom surface of the flanged opening 4 when the cap 32 is installed over the roller ball 8, enabling the underside of the roller ball 8 to contact and seal against the edges E of the passageway 9, thereby creating a seal around the passageway 9 and preventing unwanted dispersal of liquid treat through the passageway 9 into the gap 31 when the cap 32 is installed on the dispenser 1. The contacting force of the protrusion 33 against the top surface of the roller ball 8 inhibits the roller ball 8 from rotating with respect to the flanged opening 4.

When the cap 32 is removed from the top of the dispenser, the roller ball 8 is free to rotate with respect to the flanged opening 4. The amount of the liquid substance being picked up and delivered to the pet can be metered and controlled by the characteristics and dimensions of the ball, liquid, and openings. For example, when the open end of the handle 2 is fully or partially inverted as illustrated in FIG. 1, the downward pressure of the liquid substance within the storage chamber 3 allows the liquid substance to continuously flow to the roller ball 8. Accordingly, as the pet licks the ball 8, a metered amount of the liquid substance can be consumed by the pet by licking and rotating the roller ball 8 based on the width of the gap 31. It is also possible to dimension the diameter and texture of the ball to pick-up, or adhere, a predetermined amount of the liquid, according to the physical properties of the ball and the viscosity of the liquid. In this way, it is possible that the pet can be satisfied by the palatable taste of the liquid substance, yet the pet need not consume a large quantity of the substance to feel that a reward was given, thus reducing the amount of calories and cost of treats being delivered to the animal and preventing the animal from being satiated from multiple treats during training exercises. For example, the apparatus and techniques of the present general inventive concept make it possible to provide frequent, smaller size rewards to a pet to improve training opportunities, without satiating the animal and without creating a sense of bloating and/or lethargy in the animal which can result from the frequent ingestion of larger quantity solid or fattening treats.

Moreover, referring to FIG. 3, considering the physical characteristics and quantity of liquid treat that can be delivered by exemplary treat dispensers configured in accordance with the present general inventive concept, it is possible to design the shape and size of the roller ball 8, gap 31, and flanged opening 4 to establish a predetermined amount, or calorie per lick (calorie/lick), provided to the animal, based on the physical characteristics of the ball and liquid. For example, by adjusting the tolerances of the gap 31 between the roller ball 8 and the inner surface of the flanged opening 4, it is possible to control the amount of liquid being delivered to the animal with each lick, as the size of the gap 31 can facilitate the smooth and consistent dispensing of a predetermined amount of liquid treat to the animal with each lick. The apparatus and techniques of the present general inventive concept also make it possible to provide various additives such as glucosamine, herbs, vitamins, electrolytes, and the like, and combinations thereof, to supplement the base liquid treat formula to aid in the overall health and frequent refreshment of the pet. It is also possible to provide an adjustment mechanism, such as a dial or switch mechanism, or other suitable adjustment mechanism chosen with sound engineering judgment, to facilitate adjustment of the amount of liquid treat being delivered to the animal with each lick, based on the size, breed, or other characteristic elements of a particular animal, to improve training capabilities.

The present general inventive concept is not limited to any particular type of cap, and many other types of caps may be used to provide a protective cover for the roller ball 8 when the liquid treat dispenser 1 is not in use. For example, the cap 32 may be configured with a snap or other mechanical mechanism or attachment device to enable easy, one hand removal and replacement from the ball 8 and dispenser 1. It is also possible to configure the cap 32 to include a cleaning apparatus to contact the working surface of the roller ball and to keep the flange area of the dispenser clean.

As illustrated and described herein, example embodiments of the present general inventive concept can provide a liquid treat delivery system which utilizes a captured ball, or roller ball dispensing head using a roller ball, which seals against undesired spilling when the roller is withdrawn from the tongue of the pet. It is possible to configure the dimensions of the ball, the size of the gap between the ball and the flanged shoulder, and the viscosity of the liquid treat to assure a smooth and even dispensing of a predetermined amount of the liquid treat when the ball is licked by the pet. Accordingly, the size and shape of the delivery system can be configured to accommodate various sizes and types of animals, while maintaining a clean, convenient, consistent, healthy, and accessible system to store and deliver liquid food supplements to animals wherever and whenever the pet and pet owner spend time together without satiating the appetite of the animal, thus increasing the number of treats, refreshments, or rewards that can be provided to the animal over a given timeframe and/or to increase the number of training opportunities available for the animal and pet owner over the course of given activities.

While the present general inventive concept has been illustrated by description of example embodiments and while the illustrative embodiments have been described by referring to the drawings, it is not the intention of the applicant to restrict or in any way limit the scope of the appended claims to the illustrative examples. It is noted that numerous variations, modifications, and additional embodiments are possible, and accordingly, all such variations, modifications, and embodiments are to be regarded as being within the spirit and scope of the present general inventive concept. The present general inventive concept in its broader aspects is therefore not limited to the specific details, representative apparatus and methods, and illustrative examples illustrated and described. Accordingly, departures may be made from such details without departing from the spirit or scope of applicant's general inventive concept.

What is claimed is:

1. A method of supplying liquid treats to animals, comprising:
    storing a volume of liquid treat in a storage chamber of a hand-held dispensing device;
    rotatably capturing a roller ball in a flanged opening of the device, the flanged opening having an inner surface extending beyond a centerline of the roller ball to facilitate the capturing of the roller ball within the flanged opening;
    providing a passageway in the device between the roller ball and the storage chamber to communicate at least a portion of the stored volume to a first surface of the roller ball such that as the roller ball rotates with respect to the flanged opening, a predetermined amount of liquid treat cooperates with a textured surface of the first surface to facilitate adherence of the predetermined amount of liquid treat to the first surface to form a continuous and substantially uniform gap between the first surface and the inner surface to enable the roller ball to rotatably float within the flanged opening and to deliver the predetermined amount of liquid treat to an animal when the animal licks the roller ball; forming the continuous and substantially uniform gap between the first surface and the inner surface by facilitating fluidic communication between the storage chamber and the first surface of the roller ball, the gap formed by the liquid treat and extending continuously over at least half the circumference of the roller ball from the passageway to an area beyond the centerline of the roller ball; and presenting a second surface of the roller ball to the animal such that when the animal licks the second surface, the roller ball rotates with respect to the flanged opening to rotatably expose the first surface to the animal's tongue to deliver an adhered quantity of liquid treat to the animal.

2. The method of claim 1, wherein
    a width of the gap determines the amount of liquid treat that becomes exposed to an outside of the device upon rotation of the roller ball.

3. The method of claim 2, wherein the amount of liquid treat that becomes exposed to the outside of the device upon rotation of the roller ball is further determined based on at least one of a characteristic of the textured surface, a diameter of the roller ball, and a viscosity of the liquid treat.

4. The method of claim 1, further comprising:
    installing a cap over the roller ball to drive the roller ball toward the storage chamber to create a seal between the roller ball and the passageway to prevent rotation of the roller ball.

5. The method of claim 1, wherein when the hand-held dispensing device and flanged opening are oriented substantially downward, gravity enables at least a portion of stored volume of liquid treat to communicate with the first surface of the roller ball such that predetermined amounts of liquid treat become repetitively exposed to the animal via the roller ball with each lick of the roller ball by the animal.

6. The method of claim 1 further comprising:
    forming a handle on a closed end of the hand-held device to enable a user to hold the hand-held device and present the roller ball to the animal.

7. The method of claim 1, wherein the gap is dimensioned to prevent passage of liquid treat through the gap when the roller ball is not being rotated.

8. A method of training an animal using a hand-held dispensing device, comprising:
    storing a volume of viscous fluid in a storage chamber of a hand-held dispensing device;
    capturing a roller ball in a flanged opening at an open end of the dispensing device such that a first surface of the roller ball communicates with the storage chamber;
    communicating at least a portion of a stored volume of the viscous fluid to the first surface such that a quantity of the portion adheres to the first surface and forming a continuous and substantially uniform gap between the first surface and an inner surface of the flanged opening by facilitating fluidic communication between the storage chamber and the first surface of the roller ball, the gap formed by the viscous fluid and extending continuously over at least half the circumference of the roller ball from the passageway to an area beyond a centerline of the roller ball;

holding the dispensing device in the hand of a user;

causing an animal to perform a desired behavior; and rewarding the animal for performing the desired behavior by presenting a second surface of the roller ball to the animal's tongue such that when the animal licks the second surface, the roller ball rotates with respect to the flanged opening to rotatably expose the first surface to the animal's tongue to deliver an adhered quantity of viscous liquid to the animal.

9. The method of claim 8, wherein the presenting operation comprises inverting the dispensing device to orient the open end in a substantially downward direction to facilitate communication of the portion of stored volume to the first surface.

10. The method of claim 9, wherein after a first portion of adhered quantity has been delivered to the animal, the method further comprises:

communicating another portion of the stored volume to the second surface;

adhering another quantity of the stored volume to the second surface, wherein when the animal licks the first surface, the roller ball rotates with respect to the flanged opening to rotatably expose the second surface to the animal's tongue to deliver the another quantity to the animal.

11. The method of claim 10, further comprising repeating the holding and presenting operations to train the animal to perform the exhibited behavior.

12. The method of claim 9, wherein the animal repetitively licks a presented surface of the roller ball such that a predetermined amount of adhered viscous liquid is delivered to the animal's tongue with each lick.

13. The method of claim 8, wherein an adhered portion of liquid treat enables the roller ball to rotatably float within the flanged opening.

14. A hand-held device to supply a liquid consumable substance to an animal, comprising:

a storage chamber having a volume of liquid consumable substance stored therein;

a flanged opening disposed at an open end of the hand-held device;

a roller ball rotatably captured in the flanged opening, the flanged opening having an inner surface extending beyond a centerline of the roller ball to facilitate the capturing of the roller ball within the flanged opening; and a passageway disposed between a first surface of the roller ball and the storage chamber to communicate at least a portion of the stored volume to the first surface such that when the hand-held device is presented to an animal and the animal licks the roller ball, the roller ball rotates with respect to the flanged opening and a predetermined amount of liquid consumable substance cooperates with a textured surface of the first surface to facilitate adherence of the predetermined amount of liquid consumable substance to the first surface to form a continuous and substantially uniform gap between the first surface and the inner surface to enable the roller ball to rotatably float within the flanged opening and to deliver the predetermined amount of liquid consumable substance to an animal when the animal licks the roller ball; and wherein the continuous and substantially uniform gap between the first surface and the inner surface is formed by the liquid consumable substance when the liquid consumable substance communicates with the storage chamber and the first surface of the roller ball, the gap extending continuously over at least half the circumference of the roller ball from the passageway to an area beyond the centerline of the roller ball.

15. The hand-held device of claim 14, wherein an amount of adhered portion exposed to an outside of the hand-held device is based on a width of the gap.

16. The hand-held device of claim 14, further comprising:

a detachable cap installed over the roller ball to drive the roller ball toward the storage chamber to create a seal between the roller ball and the passageway to prevent rotation of the roller ball when the cap is installed over the roller ball.

17. The hand-held device of claim 14, wherein the gap enables predetermined amounts of liquid consumable substance to become repetitively exposed to the outside of the hand-held device for delivery to the animal with each lick of the roller ball by the animal.

18. The hand-held device of claim 14, further comprising a handle portion to enable a user to grip the hand-held device to present the roller ball to the animal.

* * * * *